(12) United States Patent
Ajichi et al.

(10) Patent No.: US 8,672,528 B2
(45) Date of Patent: Mar. 18, 2014

(54) PLANAR ILLUMINATION DEVICE AND DISPLAY DEVICE PROVIDED WITH THE SAME

(75) Inventors: Yuhsaku Ajichi, Osaka (JP); Tomohiko Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 13/508,552

(22) PCT Filed: Oct. 1, 2010

(86) PCT No.: PCT/JP2010/067244
§ 371 (c)(1),
(2), (4) Date: May 8, 2012

(87) PCT Pub. No.: WO2011/080955
PCT Pub. Date: Jul. 7, 2011

(65) Prior Publication Data
US 2012/0230008 A1  Sep. 13, 2012

(30) Foreign Application Priority Data

Dec. 28, 2009 (JP) ................................. 2009-296611

(51) Int. Cl.
*F21V 7/04* (2006.01)
(52) U.S. Cl.
USPC ............. 362/609; 362/19; 362/611; 362/615; 362/601; 349/61; 349/5
(58) Field of Classification Search
USPC ........... 362/601, 607, 609, 611, 613, 615, 19; 349/58, 61, 63, 65
See application file for complete search history.

(56) References Cited

U.S. PATENT DOCUMENTS

| 5,619,351 A * | 4/1997 | Funamoto et al. ............... 349/61 |
| 5,779,339 A * | 7/1998 | Konishi et al. ................ 362/606 |
| 6,412,969 B1 * | 7/2002 | Torihara et al. ................ 362/609 |

(Continued)

FOREIGN PATENT DOCUMENTS

JP  2004-071167 A  3/2004

OTHER PUBLICATIONS

Official Communication issued in International Patent Application No. PCT/JP2010/067244, mailed on Jan. 11, 2011.

*Primary Examiner* — Ali Alavi
(74) *Attorney, Agent, or Firm* — Keating & Bennett, LLP

(57) ABSTRACT

An object is to implement a narrowed picture-frame while suppressing the occurrence of light leakage and a reduction in luminance in an edge-light type backlight device. A backlight device is composed of LEDs (40); a side chassis (51) supporting a board having the LEDs (40) mounted thereon; a light guide plate (20) for allowing light emitted from the LEDs (40) to exit toward a liquid crystal panel in a planar manner; a reflection sheet (30) for allowing light traveling toward a back surface side within the light guide plate (20) to be reflected thereby; optical sheets (10) including a reflection type polarizer (11), a prism sheet (12), and a diffuser (13); and a top chassis (52) disposed on top of the optical sheets (10). Black printing (60) is provided in a part of the region of the diffuser (13). A length of the reflection type polarizer (11) is longer than a length of the light guide plate (20) such that an edge of the reflection type polarizer (11) is located closer to a side of the LEDs (40) than is an edge surface of the light guide plate (20).

11 Claims, 12 Drawing Sheets

(56) References Cited

U.S. PATENT DOCUMENTS

| | | | |
|---|---|---|---|
| 7,350,951 B2 * | 4/2008 | Sakai et al. | 362/555 |
| 7,852,560 B2 * | 12/2010 | Ouderkirk et al. | 359/489.08 |
| 2003/0043315 A1 * | 3/2003 | Umemoto et al. | 349/65 |
| 2004/0213018 A1 | 10/2004 | Torihara | |

* cited by examiner

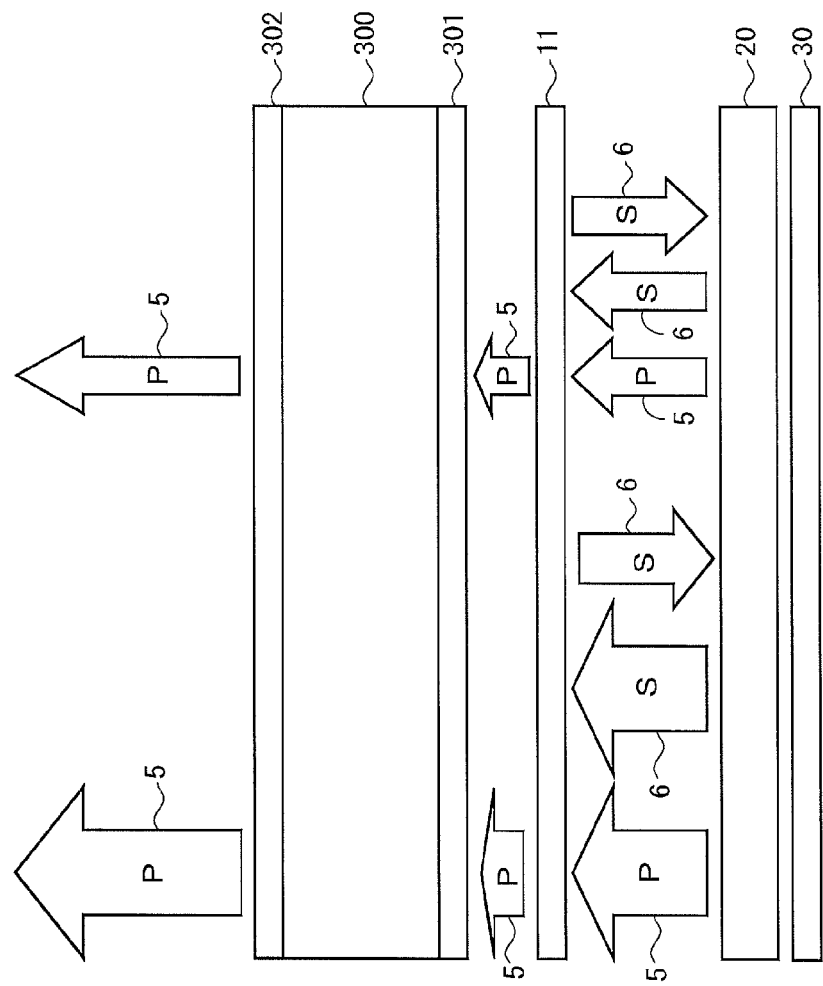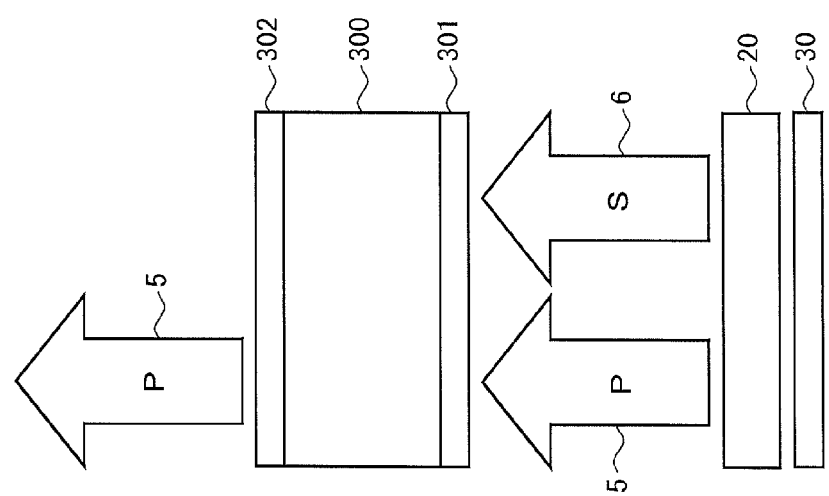

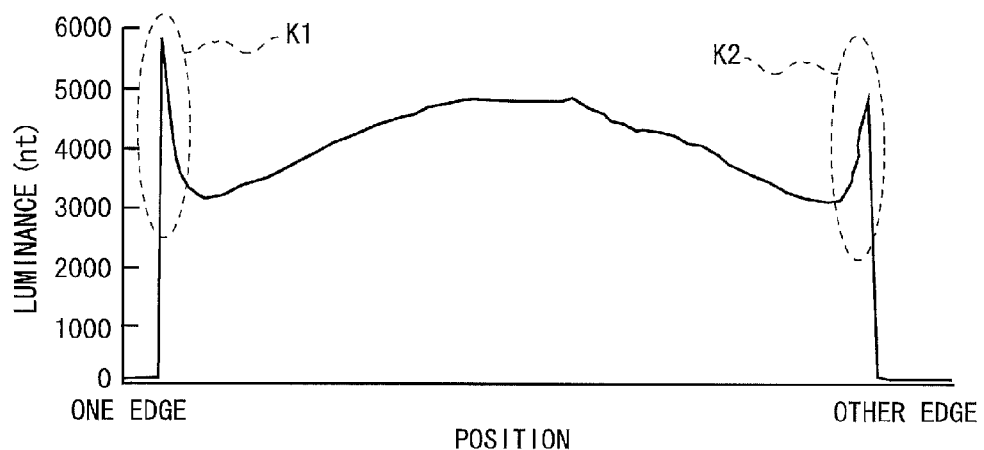
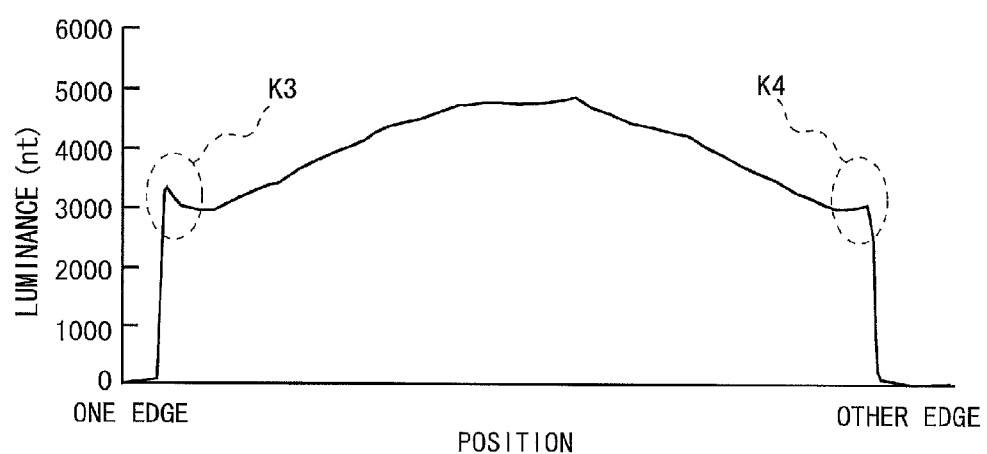

PLANAR ILLUMINATION DEVICE AND DISPLAY DEVICE PROVIDED WITH THE SAME

TECHNICAL FIELD

The present invention relates to a planar illumination device and more particularly to a planar illumination device used for a backlight of a liquid crystal display device, etc.

BACKGROUND ART

Conventionally, as one of backlight devices used in liquid crystal display devices, there is known a backlight device called an edge-light type or a side-light type. In the edge-light type backlight device, in general, light-emitting elements such as LEDs (light-emitting diodes) or CCFLs (Cold Cathode Fluorescent Lamps) are disposed near a side surface or two side surfaces which are opposite surfaces or four side surfaces of a light guide plate fabricated using a transparent resin, and surface emission toward a liquid crystal panel is performed based on light exiting from the light-emitting elements and entering the light guide plate. Note that in the following a device using LEDs as light-emitting elements will be described as an example.

FIG. 13 is a cross-sectional view showing a configuration of an edge of a conventional edge-light type backlight device. The backlight device is composed of LEDs 40; a chassis (hereinafter, referred to as the side chassis) 51 that supports aboard (not shown) having the LEDs 40 mounted thereon; a light guide plate 20 for allowing light emitted from the LEDs 40 to exit toward a liquid crystal panel in a planar manner; a reflection sheet 30 for allowing light traveling toward a back surface side within the light guide plate 20 to be reflected thereby; optical sheets 80 for increasing the efficiency of light irradiated to the liquid crystal panel; and a chassis (hereinafter, referred to as the top chassis) 52 disposed on top of the optical sheets 80. Note that, as shown in FIG. 13, the optical sheets 80 are disposed on a light-emitting surface side of the light guide plate 20 and the reflection sheet 30 is disposed on a back surface side of the light guide plate 20.

In the backlight device shown in FIG. 13, the optical sheets 80 include a reflection type polarizer 81, a prism sheet 82, and a diffuser 83. The diffuser 83 diffuses light to make the light uniform. The prism sheet 82 collects light in a light traveling direction so as to obtain a large amount of components in a direction perpendicular to the liquid crystal panel. The reflection type polarizer 81 allows some light (e.g., linearly polarized light that oscillates in a specific direction) to be transmitted therethrough and allows other light (e.g., linearly polarized light that oscillates in a direction perpendicular to the specific direction) to be reflected thereby. The light having been transmitted through the reflection type polarizer 81 enters a polarizer which is provided on a backlight device side, out of polarizers which are provided on both sides of the liquid crystal panel.

In a configuration such as that described above, light emitted from the LEDs 40 enters the light guide plate 20 directly or after being reflected by the reflection sheet 30. The light having entered the light guide plate 20 propagates through the light guide plate 20 while being reflected within the light guide plate 20 and exits to the light-emitting surface side through the optical sheets 80.

Now, the reason that the optical sheets 80 are made shorter in a left-right direction in FIG. 13 than the light guide plate 20 (the edges of the optical sheets 80 are present in the vicinity of the midpoint between a center side edge surface of the top chassis 52 and an edge surface (edge) of the light guide plate 20) will be described. If, as shown in FIG. 14, the length of the optical sheets 80 is made equal to the length of the light guide plate 20, then light exiting from an LED 40 in a direction of an arrow indicated by reference character 71 propagates through the optical sheets 80 as shown by an arrow indicated by reference character 72, resulting in a cause of light leakage from an edge portion of a display region. Hence, in order that such light can be absorbed by the top chassis 52, the optical sheets 80 are made shorter than the light guide plate 20, as shown in FIG. 13.

Meanwhile, narrowing of a picture-frame of a liquid crystal display device has been promoted in recent years. Hence, narrowing of a picture-frame of a backlight device has also been promoted. FIG. 15 is a cross-sectional view showing a configuration of an edge of a conventional edge-light type backlight device with a narrowed picture-frame. Now, taking a look at the distance in the left-right direction in FIGS. 13 and 15 between the center side edge surface of the top chassis 52 and the edge surface of the light guide plate 20, a distance L9 in the configuration shown in FIG. 15 is shorter than a distance L8 in the configuration shown in FIG. 13. As an example, in a 40-inch liquid crystal panel, the distance L9 is on the order of 5 mm. Due to the distance between the center side edge surface of the top chassis 52 and the edge surface of the light guide plate 20 being thus short, unlike the configuration shown in FIG. 13, the length of optical sheets 90 is made equal to the length of the light guide plate 20 in the left-right direction in FIG. 15. The reason for this is as follows. During use of the backlight device, with light emission of LEDs 40, the optical sheets 90 expand by heat. Hence, the size of the optical sheets 90 is designed taking into account a certain level of tolerance. Therefore, the optical sheets 90 move (are displaced) within the tolerance range rather than being fixed within a chassis. Under such a presumption, if the configuration is such that the distance from the center side edge surface of the top chassis 52 to the edges of the optical sheets 90 is made short as shown in FIG. 16A, then when, for example, a liquid crystal display device is transported, the optical sheets 90 may jump out of the chassis by vibration, as shown in FIG. 16B. Hence, in a backlight device with a narrowed picture-frame seen in recent years, in order that the optical sheets 90 are held within the chassis, the distance from a position corresponding to the center side edge surface of the top chassis 52 on the optical sheets 90 to the edges of the optical sheets 90 is set so as to have a sufficient length covering (the optical sheets 90) with the top chassis 52. For example, as shown in FIG. 15, the length of the optical sheets 90 is made equal to the length of the light guide plate 20.

However, according to the configuration shown in FIG. 15, as described above, there are concerns about the occurrence of light leakage from an edge portion of a display region. Specifically, light exiting from an LED 40 in a direction of an arrow indicated by reference character 73 in FIG. 17 propagates through the optical sheets 90 as shown by an arrow indicated by reference character 74, resulting in a cause of light leakage. Hence, there is proposed a backlight device having a configuration in which, as shown in FIG. 18, black printing 60 for absorbing light which is a cause of light leakage is provided in a part of the front surface or back surface of the optical sheets 90. According to the backlight device having the configuration shown in FIG. 18, light that exits from LEDs 40 and enters the optical sheets 90 without entering the light guide plate 20 is absorbed by the black printing 60. Hence, in the backlight device with a narrowed picture-frame, the occurrence of light leakage is suppressed.

Note that in relation to the invention of this matter, Japanese Patent Application Laid-Open No. 2004-71167 discloses an invention of a planar light source device that suppresses the occurrence of emission lines and display unevenness caused by light leakage, by sticking a light-proof tape onto all or a part of an edge portion on the light-emitting surface side of a light guide plate.

PRIOR ART DOCUMENT

Patent Document

[Patent Document 1] Japanese Patent Application Laid-Open No. 2004-71167

SUMMARY OF THE INVENTION

Problems to be Solved by the Invention

However, when the configuration is such that the black printing 60 is provided in a part of the optical sheets 90 as shown in FIG. 18, light that essentially propagates through the light guide plate 20 as shown by an arrow indicated by reference character 75 in FIG. 19A is absorbed by the black printing 60 as shown by an arrow indicated by reference character 76 in FIG. 19B. Hence, although the occurrence of light leakage is suppressed as described above, a reduction in luminance occurs.

In addition, according to the planar light source device disclosed in Japanese Patent Application Laid-Open No. 2004-71167, since an area around a light source is covered with a reflection structure (lamp reflector), the efficiency of light entering the light guide plate increases but there are problems such as those below. First, since the reflection structure is thin (e.g., on the order of 500 μm), there are concerns about insufficient strength. In addition, due to the presence of the reflection structure, it is difficult to narrow a picture-frame. Furthermore, when optical sheets expand by heat, since there is no space where the optical sheets can stretch out, a deflection occurs in the optical sheets.

An object of the present invention is therefore to implement a narrowed picture-frame while suppressing the occurrence of light leakage and a reduction in luminance in an edge-light type backlight device.

Means for Solving the Problems

A first aspect of the present invention is directed to a planar illumination device comprising: a plurality of light sources; a light guide plate for allowing light emitted from the light sources to exit in a planar manner; a plurality of optical sheets disposed on a light-emitting surface side of the light guide plate; and a reflection sheet disposed on an opposite side to the light-emitting surface side of the light guide plate with reference to a position of the light guide plate, wherein the planar illumination device has a chassis for fixing the plurality of optical sheets, at least one of the plurality of optical sheets has a light-shielding portion provided in a part of a region corresponding to a non-light-emitting region of the planar illumination device, one of the plurality of optical sheets that is disposed in a position farthest from the light guide plate is a reflection type polarizer that allows some light to be transmitted therethrough and allows other light to be reflected thereby, and a length of the reflection type polarizer is longer in a first direction than a length of the light guide plate such that an edge of the reflection type polarizer is located closer to a side of the light sources than is an edge of the light guide plate, the first direction being a direction perpendicular to a plane on which the light sources are provided out of planes forming the chassis.

According to a second aspect of the present invention, in the first aspect of the present invention, a distance in the first direction between the edge of the light guide plate and the edge of the reflection type polarizer is at least one-third of a distance between the edge of the light guide plate and the plane of the chassis having the light sources provided thereon.

According to a third aspect of the present invention, in the first aspect of the present invention, a distance in the first direction between the edge of the light guide plate and the edge of the reflection type polarizer is at least 1 millimeter.

According to a fourth aspect of the present invention, in the first aspect of the present invention, the light-shielding portion is provided in at least a one-third region, in the first direction, of a region from a position corresponding to an edge of a light-emitting region of the planar illumination device, on the optical sheet, to an edge of the optical sheet other than the reflection type polarizer.

According to a fifth aspect of the present invention, in the first aspect of the present invention, the light-shielding portion is formed by providing black printing on the optical sheet.

According to a sixth aspect of the present invention, in the first aspect of the present invention, a portion of the chassis is black, the portion being disposed more on a light-emitting surface side than the optical sheets.

According to a seventh aspect of the present invention, in the sixth aspect of the present invention, a thickness of the portion of the chassis disposed more on the light-emitting surface side than the optical sheets is 1.5 millimeters or less.

According to an eighth aspect of the present invention, in the first aspect of the present invention, the reflection type polarizer is composed of a plurality of thin films with different refractive indices, and allows linearly polarized light oscillating in a specific direction to be transmitted therethrough and allows linearly polarized light oscillating in a direction perpendicular to the specific direction to be reflected thereby.

According to a ninth aspect of the present invention, in the first aspect of the present invention, the reflection type polarizer is composed of a cholesteric liquid crystal layer and a phase plate, the cholesteric liquid crystal layer allows circularly polarized light rotating in a specific direction to be transmitted therethrough and allows circularly polarized light rotating in a direction which is different from the specific direction to be reflected thereby, and the phase difference plate turns the circularly polarized light having been transmitted through the cholesteric liquid crystal layer into linearly polarized light.

According to a tenth aspect of the present invention, in the first aspect of the present invention, the reflection type polarizer is composed of a base having a plurality of metal fine lines formed thereon, and for the light having a wavelength greater than a spacing between the plurality of metal fine lines, the reflection type polarizer allows a component having an electric-field vector perpendicular to the metal fine lines to be transmitted therethrough and allows a component having an electric-field vector parallel to the metal fine lines to be reflected thereby.

An eleventh aspect of the present invention is directed to a display device further comprising a display panel; and a planar illumination device according to the first aspect of the present invention.

Effects of the Invention

According to the first aspect of the present invention, the configuration is such that an edge of the reflection type polarizer protrudes further toward the light source side than an edge of the light guide plate in a direction between a plane (of the chassis) having the light sources provided thereon and a plane opposite thereto. Hence, some light that is absorbed by the chassis above the light sources in the conventional configuration is reflected by the reflection type polarizer and enters the light guide plate. By this, the efficiency of use of light exiting from the light sources increases, improving luminance. In addition, an optical sheet has a light-shielding portion provided in a part of a region corresponding to the non-light-emitting region. Hence, light that exits from the light sources and enters the optical sheets without entering the light guide plate is absorbed by the light-shielding portion. By this, the occurrence of light leakage near a boundary portion between the light-emitting region and the non-light-emitting region is suppressed. Due to the above, a narrowed picture-frame of the backlight device is implemented while suppressing the occurrence of light leakage and a reduction in luminance.

According to the second aspect of the present invention, light that is absorbed by the chassis above the light sources in the conventional configuration is more efficiently reflected by the reflection type polarizer and enters the light guide plate. By this, a narrowed picture-frame of the backlight device is implemented while effectively suppressing a reduction in luminance.

According to the third aspect of the present invention, as with the second aspect of the present invention, a narrowed picture-frame of the backlight device is implemented while effectively suppressing a reduction in luminance.

According to the fourth aspect of the present invention, light that becomes a cause of light leakage near a boundary portion between the light-emitting region and the non-light-emitting region is more effectively absorbed by the light-shielding portion. By this, a narrowed picture-frame of the backlight device is implemented while effectively suppressing the occurrence of light leakage.

According to the fifth aspect of the present invention, the occurrence of light leakage near a boundary portion between the light-emitting region and the non-light-emitting region can be suppressed with a relatively simple configuration.

According to the sixth aspect of the present invention, since light is difficult to be transmitted through black, the occurrence of light leakage from the chassis portion is suppressed. By this, a reduction in display quality caused by light leakage is suppressed.

According to the seventh aspect of the present invention, in a slimmed-down backlight device, the same advantageous effect as that obtained in the sixth aspect of the present invention can be obtained.

According to the eighth aspect of the present invention, in a planar illumination device having a configuration using a reflection type polarizer implemented by a thin film stacked scheme, the same advantageous effects as those obtained in the first aspect of the present invention can be obtained.

According to the ninth aspect of the present invention, in a planar illumination device having a configuration using a reflection type polarizer implemented by a cholesteric liquid crystal scheme, the same advantageous effects as those obtained in the first aspect of the present invention can be obtained.

According to the tenth aspect of the present invention, in a planar illumination device having a configuration using a reflection type polarizer implemented by a wire-grid scheme, the same advantageous effects as those obtained in the first aspect of the present invention can be obtained.

According to the eleventh aspect of the present invention, a display device is provided with the planar illumination device according to the first aspect of the present invention. By this, a narrowed picture-frame of the display device is implemented while suppressing the occurrence of light leakage and a reduction in luminance.

BRIEF DESCRIPTION OF THE DRAWINGS

FIGS. 4A and 4B are diagrams for describing an advantageous effect obtained by a reflection type polarizer in the embodiment.

FIG. 7 is a graph showing luminance according to the position on a liquid crystal panel for when black printing is not provided on the optical sheets in the embodiment.

FIG. 8 is a graph showing luminance according to the position on the liquid crystal panel for when the width of black printing on the optical sheets is 3 mm in the embodiment.

MODE FOR CARRYING OUT THE INVENTION

An embodiment of the present invention will be described below with reference to the accompanying drawings.

<1. Configuration of a Backlight Device>

Figure 1:
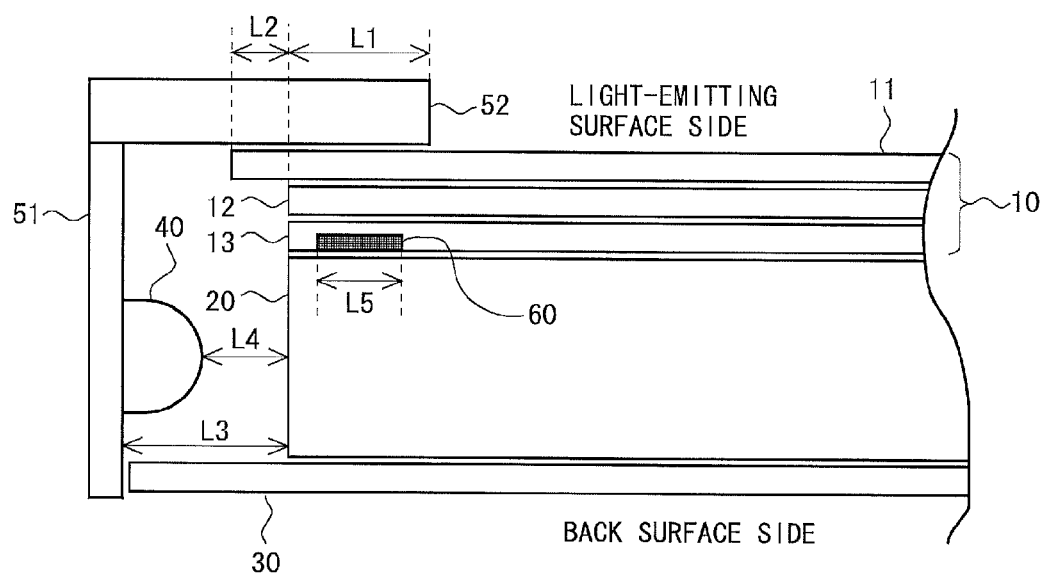
FIG. 1 is a cross-sectional view showing a configuration of an edge of an edge-light type backlight device according to an embodiment of the present invention.
Figure 2:
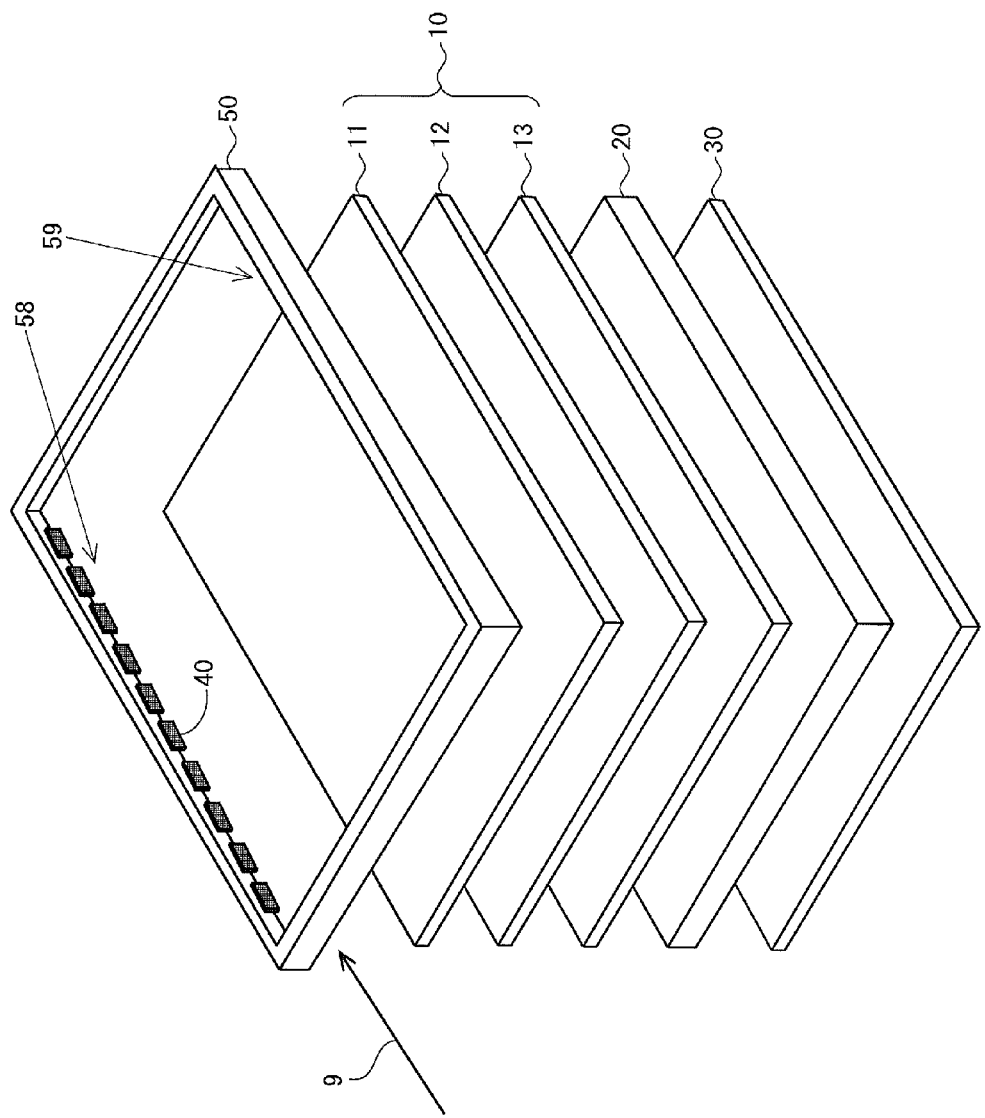
FIG. 2 is an exploded perspective view of the backlight device according to the embodiment.

FIG. 2 is an exploded perspective view of an edge-light type backlight device according to an embodiment of the present invention. FIG. 1 is a cross-sectional view of the backlight device as viewed from a direction of an arrow indicated by reference character 9 in FIG. 2. The backlight device is composed of a plurality of LEDs 40 serving as light sources (light-emitting elements); a chassis 50; a light guide plate 20 for allowing light emitted from the LEDs 40 to exit toward a liquid crystal panel in a planar manner; a reflection sheet 30 for allowing light traveling toward a back surface side within the light guide plate 20 to be reflected thereby; and optical sheets 10 for increasing the efficiency of light irradiated to the liquid crystal panel. The LEDs 40 are mounted on a board with, for example, 10 mm pitch (intervals) and, as shown in FIG. 2, the board is fixed to one side 58 of the chassis 50 and an opposite side 59 thereto. In addition, the LEDs 40 are disposed so as to have a light emission peak in a rightward direction in FIG. 1. As shown in FIG. 1, the chassis 50 is composed of a side chassis 51 that supports the board having the LEDs 40 mounted thereon; and a top chassis 52 disposed on top of the optical sheets 10.

Figure 13:
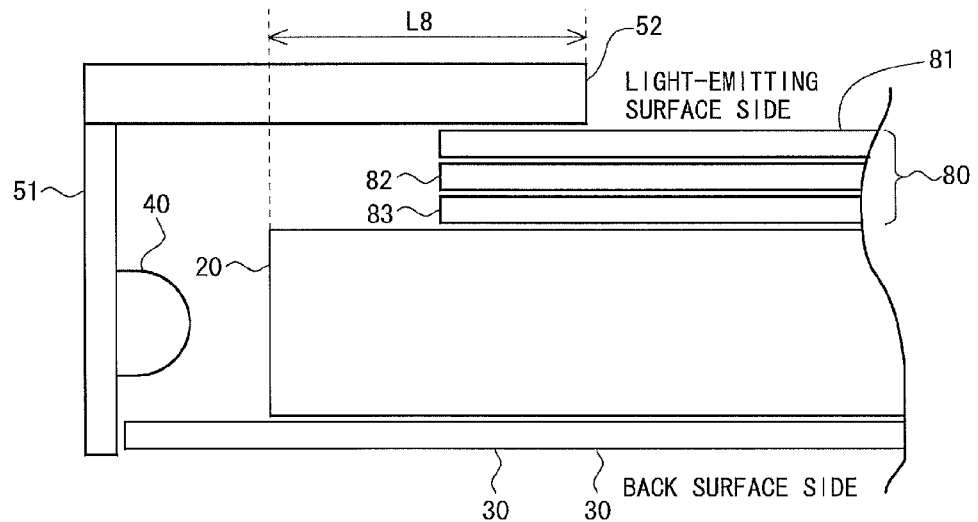
FIG. 13 is a cross-sectional view showing a configuration of an edge of a conventional edge-light type backlight device.

As with the conventional backlight devices shown in FIG. 13, etc., the optical sheets 10 include a reflection type polarizer 11, a prism sheet 12, and a diffuser 13. In the present embodiment, as shown in FIG. 1, black printing 60 is provided in a part of the region of the front surface or back surface of the diffuser 13 among the optical sheets 10. The black printing 60 functions as a light-shielding portion. The reflection type polarizer 11 has a different configuration than the conventional backlight devices. Specifically, the reflection type polarizer 11 is longer in a left-right direction (first direction) in FIG. 1 than the light guide plate 20, and an edge of the reflection type polarizer 11 is located closer to the side of the LEDs 40 (the side of the side chassis 51) than is an edge surface (edge) of the light guide plate 20. Note that in the following the distance from the edge surface of the light guide plate 20 to the edge of the reflection type polarizer 11 is referred to as the amount of protrusion and is indicated by reference character L2 (see FIG. 1).

Note that an example of distances indicated by reference characters L1 to L5 in FIG. 1 is as follows:

Distance L1 between a center side edge surface of the top chassis 52 and the edge surface of the light guide plate 20: 5 mm.

The amount of protrusion L2: 1 mm.

Distance L3 between the edge surface of the light guide plate 20 and the side chassis 51: 3 mm.

Distance L4 between the edge surface of the light guide plate 20 and a tip of each LED 40: 1.6 mm.

Width L5 of the black printing 60: 3 mm.

Figure 3:
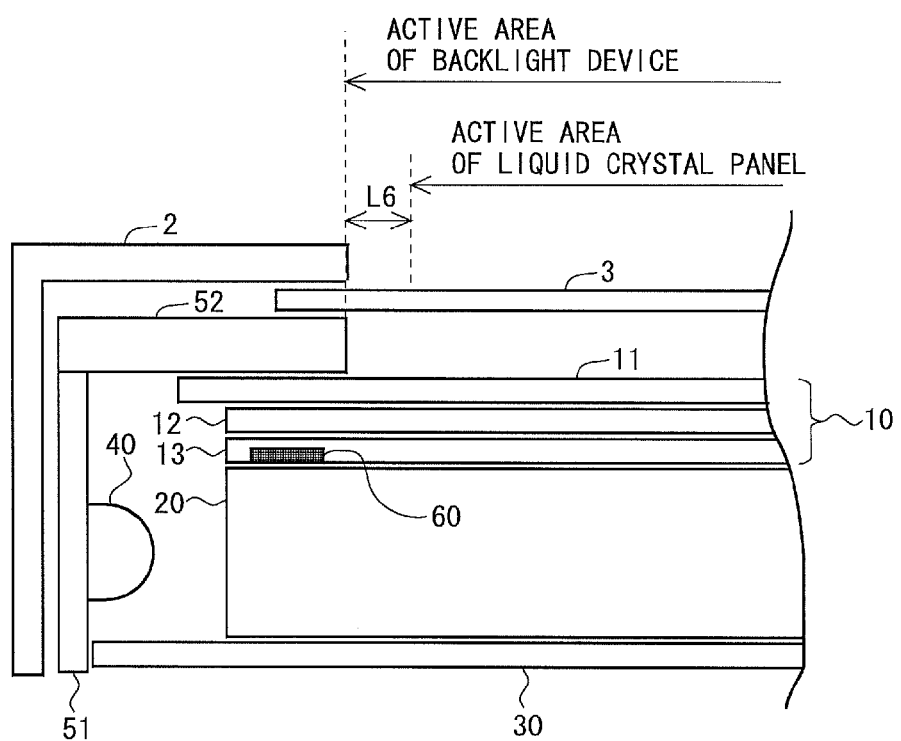
FIG. 3 is a cross-sectional view showing a configuration of an edge of a liquid crystal display device including the backlight device according to the embodiment.

FIG. 3 is a cross-sectional view showing a configuration of an edge of a liquid crystal display device including the above-described backlight device. The backlight device is fixed to a chassis 2 of the liquid crystal display device. At that time, a liquid crystal panel 3 is disposed on the opposite side to the light guide plate 20 with reference to the position of the optical sheets 10. Here, as shown in FIG. 3, an active area of the liquid crystal panel 3 (a display region where an image is actually displayed) is narrower than an active area of the backlight device (a region where light can be irradiated). As an example, a distance L6 from an edge of the active area of the liquid crystal panel 3 to an edge of the active area of the backlight device is 2 mm. In general, a black matrix is formed in a region corresponding to the L6 for one of two glass substrates forming the liquid crystal panel 3. Hence, the region is visually recognized as having black color from the outside. Note that the backlight device according to the present embodiment is typically employed as a backlight device for a large-sized liquid crystal panel.

<2. For the Reflection Type Polarizer>

The reflection type polarizer 11 is employed as one of the optical sheets 10 that is disposed closest to the liquid crystal panel side (a light-emitting surface side in FIG. 1). The reflection type polarizer 11 allows some light to be transmitted therethrough and allows other light to be reflected thereby. Then, the light having been transmitted through the reflection type polarizer 11 enters a polarizer which is provided on the backlight device side, out of polarizers which are provided on both sides of the liquid crystal panel.

Meanwhile, in the present embodiment, the reflection type polarizer 11 having a plurality of thin films with different refractive indices stacked on top of each other is employed. In the reflection type polarizer 11, linearly polarized light is generated by multi-level reflection on the plurality of thin films. An example of the reflection type polarizer 11 includes a DBEF (Dual Brightness Enhancement Film) manufactured by Sumitomo 3M Limited (DBEF is a registered trademark). The reflection type polarizer 11 allows only linearly polarized light (P wave) that oscillates in a specific direction to be transmitted therethrough and allows linearly polarized light (S wave) that oscillates in a direction perpendicular to the specific direction to be reflected thereby. The S wave reflected by the reflection type polarizer 11 propagates through the light guide plate 20 and is reflected again by the reflection sheet 30 and is split into a P wave and an S wave. In this manner, light reuse is performed, increasing the amount of light irradiated to the liquid crystal panel. Note that in the following the implementation scheme of the reflection type polarizer 11 employed in the present embodiment is referred to as the thin film stacked scheme.

FIGS. 4A and 4B are diagrams for describing an advantageous effect obtained by the reflection type polarizer 11 in the present embodiment. Note that in FIGS. 4A and 4B reference characters 5, 6, 300, 301, and 302 respectively indicate a P wave, an S wave, a liquid crystal layer, a polarizer on the back surface side of the liquid crystal panel, and a polarizer on the front surface side of the liquid crystal panel. Note also that those optical sheets other than the reflection type polarizer 11 are omitted. According to a configuration not including the reflection type polarizer 11, as shown in FIG. 4A, of a P wave 5 and an S wave 6 exiting from a light guide plate 20, the S wave 6 is absorbed by the polarizer 301 on the back surface side of the liquid crystal panel. On the other hand, according to a configuration including the reflection type polarizer 11, as shown in FIG. 4B, S waves 6 reflected by the reflection type polarizer 11 exit from a light guide plate 20 again as P waves 5 and S waves 6. Then, the P waves 5 are provided to the polarizer 301 on the back surface side of the liquid crystal panel, and the S waves 6 are reflected by the reflection type polarizer 11 and reused.

As described above, in the present embodiment, by employing the reflection type polarizer 11 of the thin film stacked scheme as one of the optical sheets 10 that is closest to the liquid crystal panel side, efficient use of light exiting from the light guide plate 20 is performed.

<3. For the Amount of Protrusion of the Reflection Type Polarizer and the Width of the Black Printing>

Next, how the amount of protrusion L2 and the width L5 of the black printing 60 on the optical sheets 10 (in the left-right direction in FIG. 1) are determined in the present embodiment will be described.

Figure 5:
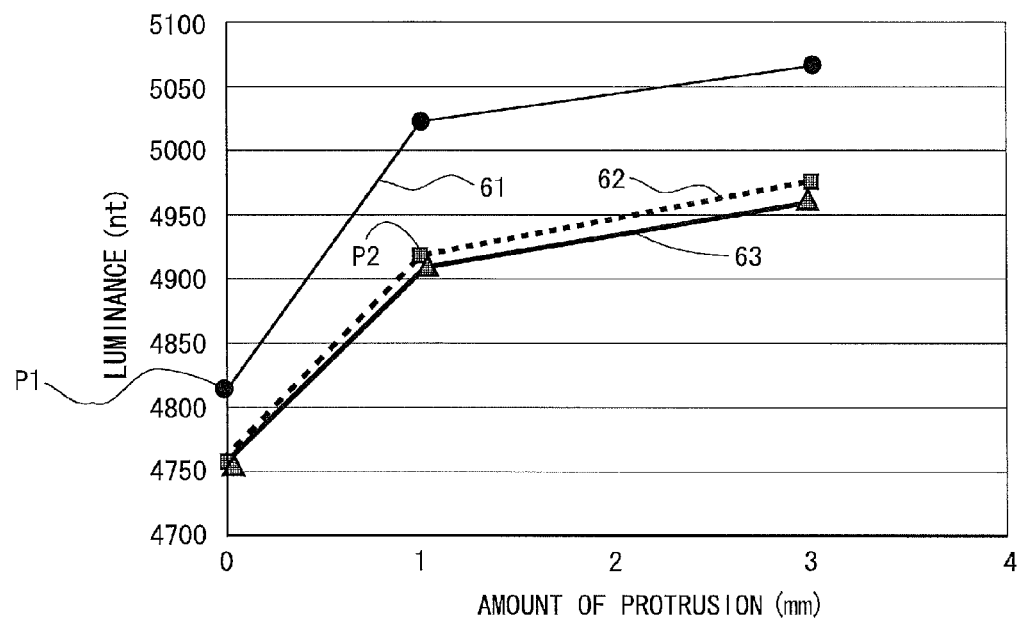
FIG. 5 is a graph showing a relationship between the amount of protrusion of the reflection type polarizer from an edge surface of a light guide plate and luminance in the embodiment.

FIG. 5 is a graph showing a relationship (experimental results) between the amount of protrusion L2 and luminance for a given 40-inch liquid crystal panel (the distance L1 between the center side edge surface of the top chassis 52 and the edge surface of the light guide plate 20 is 5 mm and the distance L3 between the edge surface of the light guide plate 20 and the side chassis 51 is 3 mm.). A thin solid line indicated by reference character 61 shows data obtained when black printing 60 is not provided on the optical sheets 10. A thick dotted line indicated by reference character 62 shows data obtained when black printing 60 with a width of 3 mm is provided on the optical sheets 10. A thick solid line indicated by reference character 63 shows data obtained when black printing 60 with a width of 5 mm is provided on the optical sheets 10. From FIG. 5, in all cases, it is grasped that though a remarkable luminance increase effect is obtained when the amount of protrusion is extended from 0 mm to 1 mm, the luminance increase effect is moderate even if the amount of protrusion is further extended from 1 mm. Namely, it is considered that by setting the amount of protrusion to 1 mm, the amount of light entering the light guide plate 20 can be efficiently increased. In addition, comparing luminances between when the width of the black printing 60 is 3 mm and when 5 mm, the luminance for 3 mm is only slightly higher than the luminance for 5 mm, regardless of the amount of protrusion. Note that although higher luminance can be obtained when the black printing 60 is not provided compared to when the black printing 60 is provided, since significant light leakage occurs as will be described later when the black printing 60 is not provided, a configuration with no black printing 60 cannot be employed.

Figure 6:
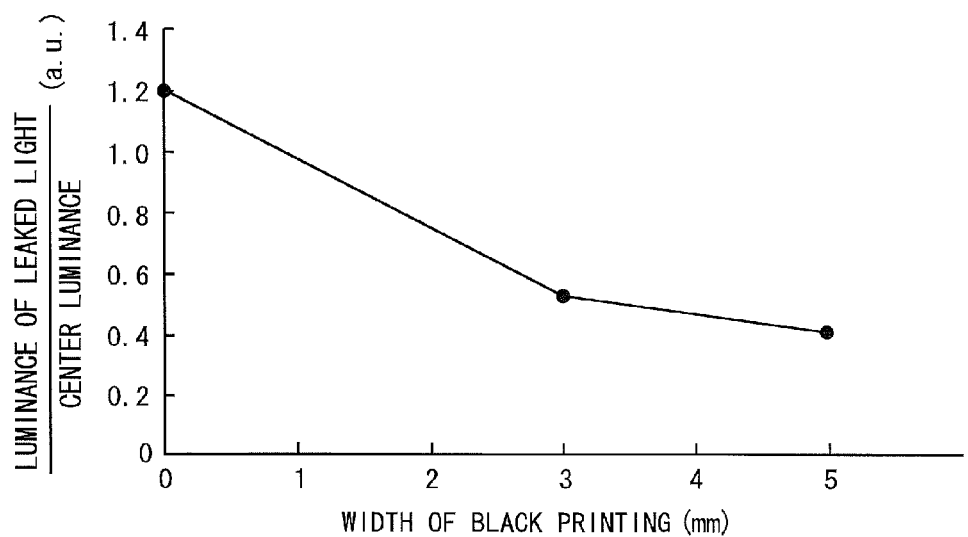
FIG. 6 is a graph showing a relationship between the width of black printing on optical sheets and light leakage in the embodiment.
Figure 9:
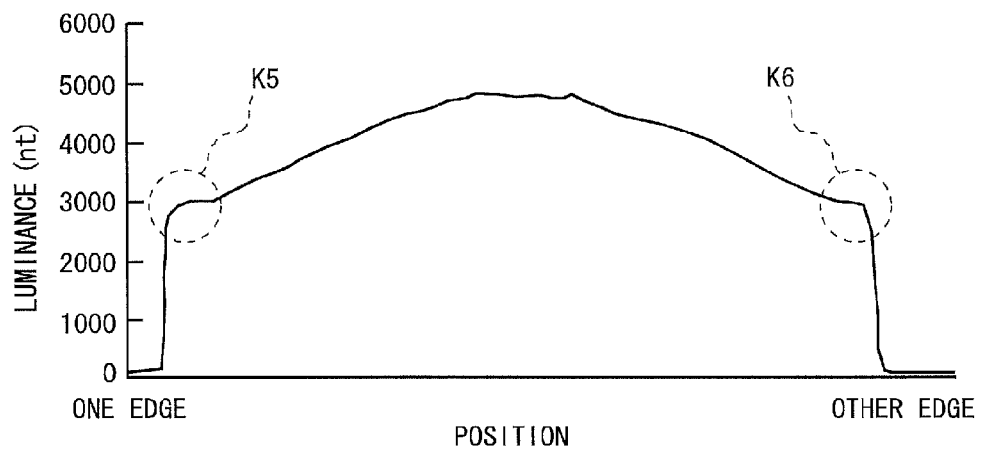
FIG. 9 is a graph showing luminance according to the position on the liquid crystal panel for when the width of black printing on the optical sheets is 5 mm in the embodiment.

FIG. 6 is a graph showing a relationship (experimental results) between the width of the black printing 60 on the optical sheets 10 and light leakage. In FIG. 6, the horizontal axis represents the width of the black printing 60 and the vertical axis represents the ratio of the luminance of leaked light to luminance at a central portion of the liquid crystal panel (i.e., the relative value). From FIG. 6, it is grasped that when the width of the black printing 60 is 3 mm, light leakage is about one-half compared to when the black printing 60 is not provided (the width of the black printing 60 is 0 mm). In addition, it is grasped that though a remarkable light leakage suppression effect is obtained when the width of the black printing 60 is extended from 0 mm to 3 mm, the light leakage suppression effect is moderate even if the width of the black printing 60 is further extended from 3 mm. FIGS. 7, 8, and 9 are respectively graphs showing luminance (experimental results) according to the position on the liquid crystal panel for when the black printing 60 is not provided on the optical sheets 10, when the width of the black printing 60 on the optical sheets 10 is 3 mm, and when the width of the black printing 60 on the optical sheets 10 is 5 mm. In FIGS. 7, 8, and 9, the position of one edge corresponds to a position indicated by an arrow of reference character 58 in FIG. 2 and the position of the other edge corresponds to a position indicated by an arrow of reference character 59 in FIG. 2. From portions indicated by reference characters K1 and K2 in FIG. 7, it is grasped that when the black printing 60 is not provided, significant light leakage occurs. In addition, from portions indicated by reference characters K3 and K4 in FIG. 8, it is grasped that when the width of the black printing 60 is 3 mm, slight light leakage occurs. From portions indicated by reference characters K5 and K6 in Figure, it is grasped that when the width of the black printing 60 is 5 mm, almost no light leakage occurs. 9. From the above facts, it is considered that by setting the width of the black printing 60 on the optical sheets 10 to 3 mm, light leakage is efficiently suppressed.

Due to the above, in the present embodiment, in the 40-inch liquid crystal panel, the amount of protrusion L2 is 1 mm and the width L5 of the black printing 60 is 3 mm. Note, however, that these values are an example and thus the present invention is not limited thereto. Note that it is preferred that the amount of protrusion L2 be at least one-third of the distance L3 between the edge surface of the light guide plate 20 and the side chassis 51. Note also that it is preferred that the width L5 of the black printing 60 be at least one-third of the distance between a position (on the diffuser 13) corresponding to the edge of the active area of the backlight device (see FIG. 3) and an edge of the diffuser 13.

<4. For the Chassis>

Next, the top chassis 52 in the present embodiment will be described in detail. In the present embodiment, a polycarbonate is employed as the material and the thickness is 1.0 mm to 1.5 mm. In addition, black is employed as the color. As described above, the backlight device according to the present embodiment is typically employed as one for a large-sized liquid crystal panel. The reason that black is employed as the color of the top chassis 52 in the present embodiment will be described below, comparing with a backlight device for a small-sized liquid crystal panel of a mobile phone, etc., which generally employs a white chassis.

In general, a backlight device for a small-sized liquid crystal panel is configured such that LEDs are mounted on an FPC (Flexible Printed Circuit) and a light guide plate is adhered to the FPC. Therefore, even if the light guide plate expands by heat, the LEDs are not physically pressured by the light guide plate or a chassis. In addition, in the backlight device for a small-sized liquid crystal panel, since the light guide plate is small compared to that of a device for a large-sized liquid crystal panel, the amount of expansion by heat is small. Hence, even if the light guide plate expands by heat, the LEDs are not physically pressured by the light guide plate. Furthermore, since the required luminance is low compared to that of the device for a large-sized liquid crystal panel, the amount of heat received by the light guide plate is also small. From the above facts, the distance between the LEDs and the light guide plate can be set to substantially 0 mm, and thus, the occurrence of light leakage based on light that exits from the LEDs and does not enter the light guide plate is suppressed. In addition, since the required luminance is low compared to that of the device for a large-sized liquid crystal panel as described above and thus a sufficient amount of light can be obtained with a small number of LEDs, even if light leakage occurs, the influence exerted on display quality is relatively small.

On the other hand, in a backlight device for a large-sized liquid crystal panel, in general, a board having the LEDs 40 mounted thereon is fixed to the side chassis 51, and the LEDs 40 and the light guide plate 20 are not formed integrally. Hence, taking into account heat expansion of the light guide plate 20, a space is provided between the LEDs 40 and the light guide plate 20. Therefore, the amount of light that can become a cause of light leakage is large compared to that of the backlight device for a small-sized liquid crystal panel. In addition, in a large-sized liquid crystal panel, the required luminance is high and thus a large number of LEDs 40 are arranged side by side on the chassis. Hence, light leakage appears as emission lines and thus the display quality significantly decreases.

Under such a presumption, if white is employed as the color of the top chassis 52, then since light is easily transmitted through white, light leakage occurs unless the thickness of the top chassis 52 is considerably large. On the other hand, since light is difficult to be transmitted through black, by employing black as the color of the top chassis 52, even in the backlight device for a large-sized liquid crystal panel where the thickness of the top chassis 52 is made relatively small, a reduction in display quality caused by light leakage is suppressed.

<5. Advantageous Effects>

Figure 10:
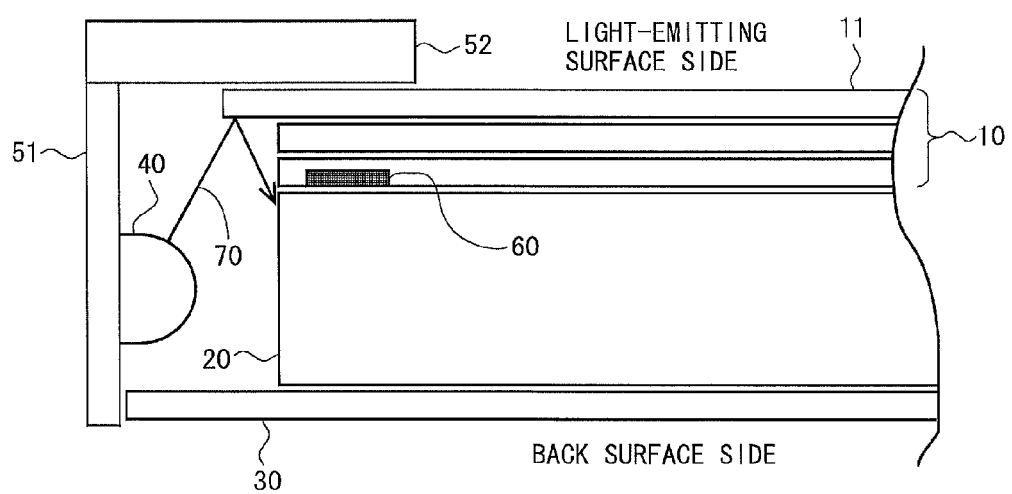
FIG. 10 is a diagram for describing an advantageous effect obtained in the embodiment.

According to the present embodiment, in a backlight device with a narrowed picture-frame, in a direction between LEDs facing each other, the length of the reflection type polarizer 11 is longer than the length of the light guide plate 20. Namely, compared to the conventional configurations, the configuration is such that an edge of the reflection type polarizer 11 protrudes further toward the side of the LEDs 40 than an edge surface of the light guide plate 20. Hence, some light that is absorbed by the top chassis 52 in the conventional configuration is reflected by the reflection type polarizer 11 as shown by an arrow indicated by reference character 70 in FIG. 10 and enters the light guide plate 20. By this, the efficiency of use of light exiting from the LEDs 40 increases, improving luminance. In addition, according to the present embodiment, the black printing 60 serving as a light-shielding portion is provided in a part of the region of the diffuser 13 among the optical sheets 10. Hence, light that exits from the LEDs 40 and enters the optical sheets 10 without entering the light guide plate 20 is absorbed by the black printing 60. By this, the occurrence of light leakage in an edge portion of a display region (near an edge of the active area of the backlight device) is suppressed.

Figure 14:
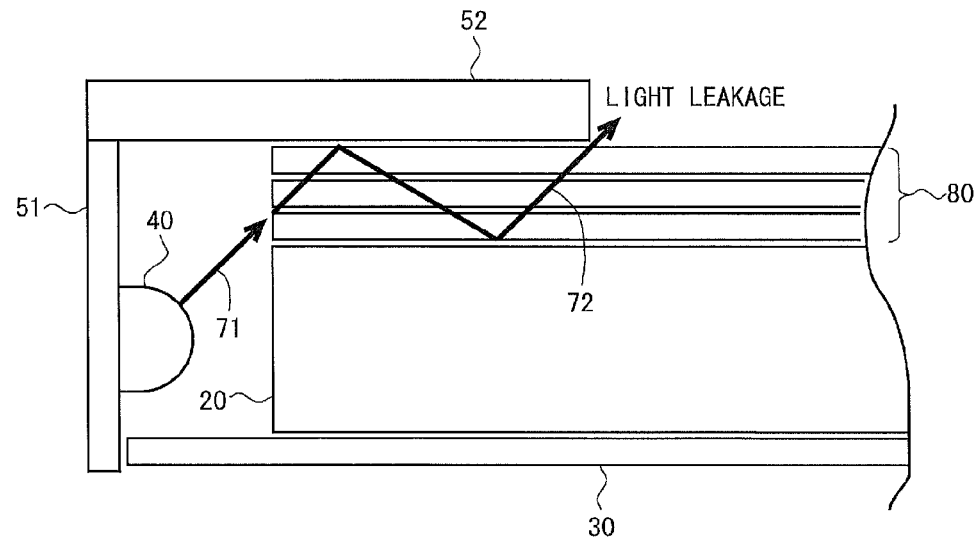
FIG. 14 is a diagram for describing the reason that optical sheets are made shorter than a light guide plate in a conventional example.
Figure 15:
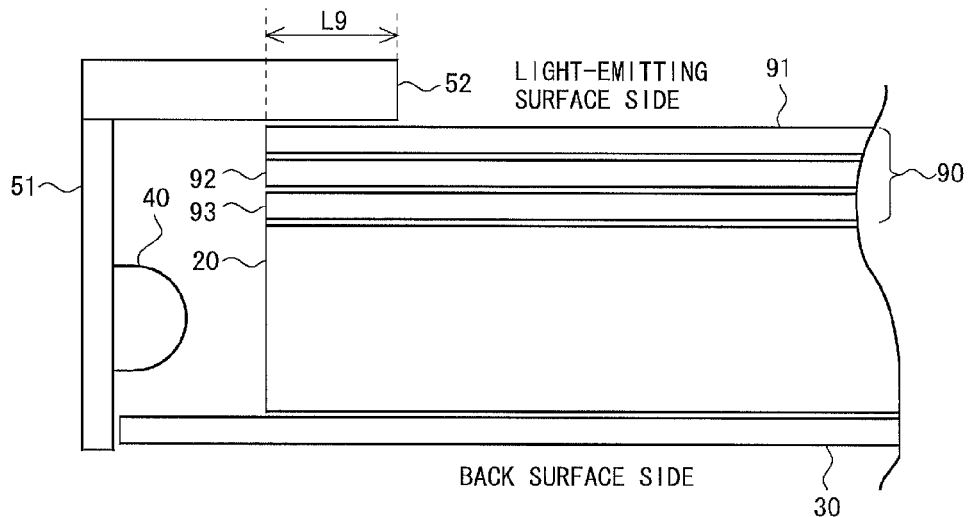
FIG. 15 is a cross-sectional view showing a configuration of an edge of a conventional edge-light type backlight device with a narrowed picture-frame.
Figure 16A:
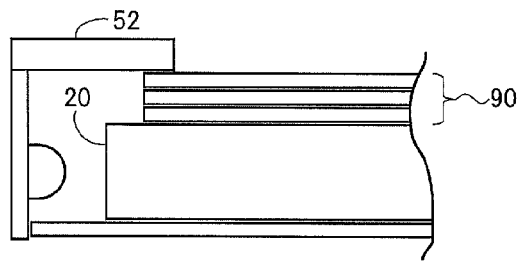
FIGS. 16A and 16B are diagrams for describing the reason that the length of optical sheets is made equal to the length of a light guide plate in the conventional edge-light type backlight device with a narrowed picture-frame.
Figure 16B:
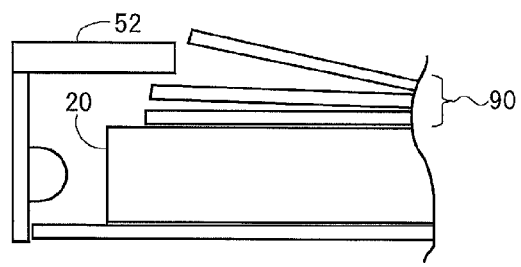
Figure 17:
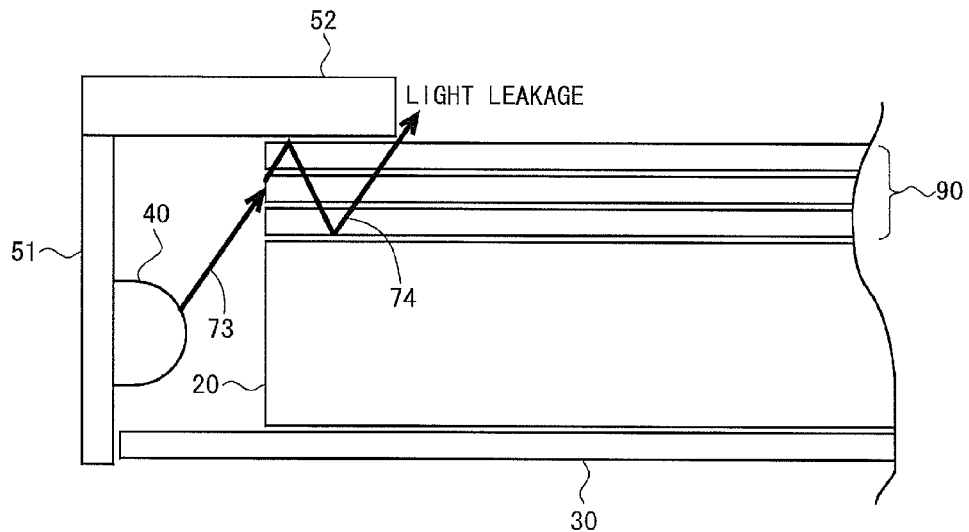
FIG. 17 is a diagram for describing light leakage in a conventional example.
Figure 18:
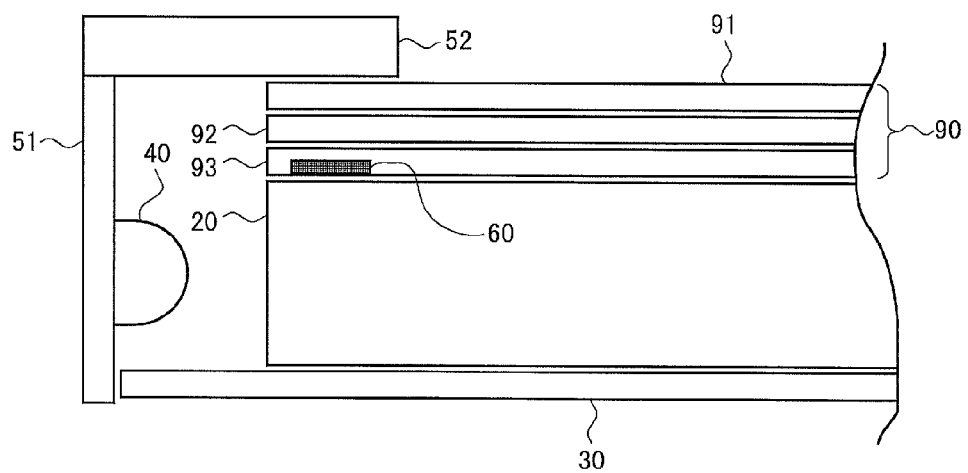
FIG. 18 is a cross-sectional view showing a configuration of an edge of a conventional edge-light type backlight device where black printing is provided on optical sheets.
Figure 19A:
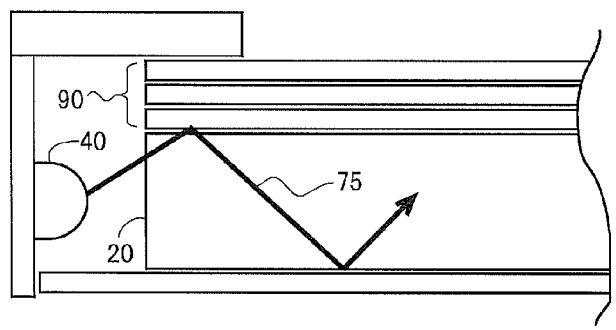
FIGS. 19A and 19B are diagrams for describing a cause of a reduction in luminance in the backlight device having the configuration shown in FIG. 18.
Figure 19B:
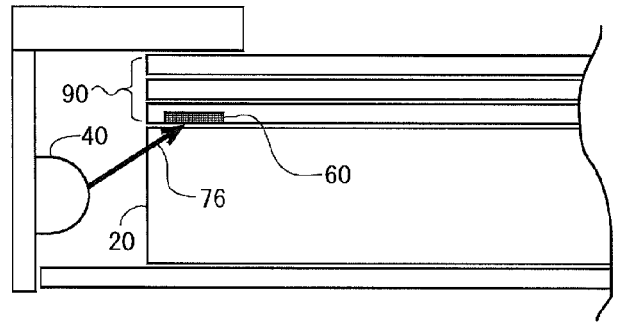

Meanwhile, according to a configuration shown in FIG. 14 (a configuration in which though a picture-frame is narrowed, black printing 60 is not provided on optical sheets 10), in the graph shown in FIG. 5, the luminance has a value in a position indicated by reference character P1. On the other hand, according to the present embodiment, in the graph shown in FIG. 5, the luminance has a value in a position indicated by reference character P2. From these facts, it is grasped that an increase in luminance as a result of employing a configuration in which the edge of the reflection type polarizer 11 protrudes further toward the side of the LEDs 40 than the edge surface of the light guide plate 20 is greater than a reduction in luminance as a result of providing the black printing 60 on the optical sheets 10. Due to the above, in an edge-light type backlight device, a narrowed picture-frame is implemented while suppressing the occurrence of light leakage and a reduction in luminance.

Furthermore, according to the present embodiment, a black chassis is employed as the top chassis 52. If a white chassis is employed as the top chassis 52, then light leakage may occur depending on the thickness of the chassis (the smaller the thickness of the chassis, the larger the amount of light leakage). In this regard, when a black chassis is employed as in the present embodiment, since light is absorbed by the chassis, the occurrence of light leakage is effectively suppressed. By this, a reduction is display quality caused by light leakage is suppressed.

<6. Variants, Etc.>

Although in the above-described embodiment the reflection type polarizer 11 of the thin film stacked scheme is employed, the present invention is not limited thereto. For example, a configuration employing a reflection type polarizer 11 which is implemented by schemes described below (referred to as the cholesteric liquid crystal scheme and wire-grid scheme) may be employed.

Figure 11:
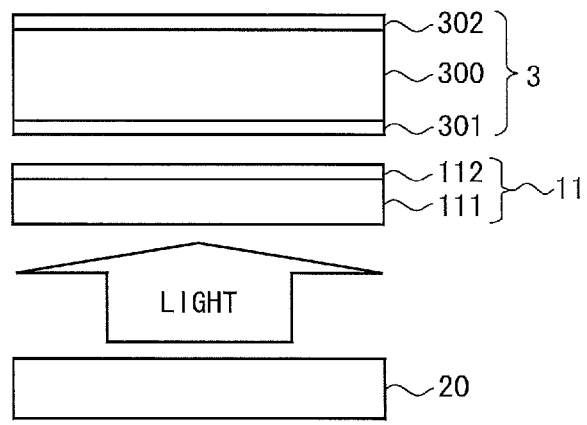
FIG. 11 is a diagram for describing a reflection type polarizer of a cholesteric liquid crystal scheme in a variant of the embodiment.

A reflection type polarizer 11 of the cholesteric liquid crystal scheme is composed of a cholesteric liquid crystal layer 111 and a phase plate 112. As shown in FIG. 11, of the cholesteric liquid crystal layer 111 and the phase plate 112, the cholesteric liquid crystal layer 111 is disposed on the side of a light guide plate 20, and the phase plate 112 is disposed on the side of a light guide plate 3. Note that in FIG. 11 those optical sheets other than the reflection type polarizer 11 are omitted. In such a configuration, the cholesteric liquid crystal layer 111 allows circularly polarized light that rotates in a specific direction to be transmitted therethrough and allows circularly polarized light that rotates in a direction which is different from the specific direction to be reflected thereby. In addition, the phase plate 112 turns the circularly polarized light having been transmitted through the cholesteric liquid crystal layer 111 into linearly polarized light. Due to the above, light transmitted through the cholesteric liquid crystal layer 111 is provided to a polarizer 301 on the back surface side of the liquid crystal panel 3, and light reflected by the cholesteric liquid crystal layer 111 is reused.

Figure 12:
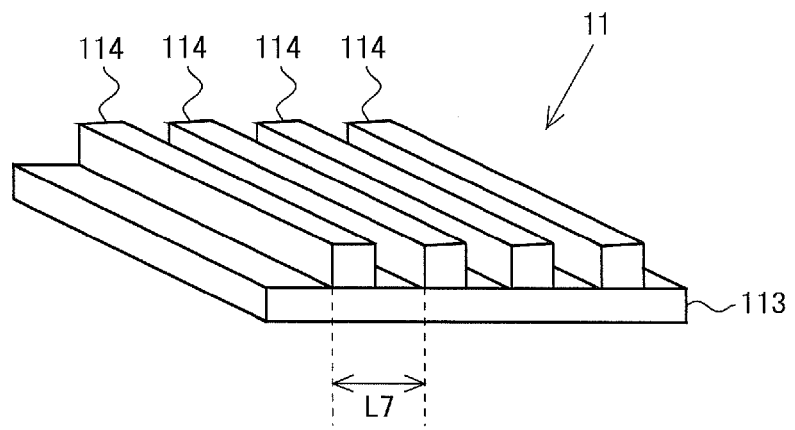
FIG. 12 is a diagram for describing a reflection type polarizer of a wire-grid scheme in a variant of the embodiment.

A reflection type polarizer 11 of the wire-grid scheme is composed of, as shown in FIG. 12, a base (board) 113 having a plurality of metal fine lines 114 formed thereon. In such a configuration, for light having a wavelength greater than a spacing L7 at which the plurality of metal fine lines 114 are formed, the reflection type polarizer 11 allows a component having an electric-field vector perpendicular to the metal fine lines 114 to be transmitted therethrough and allows a component having an electric-field vector parallel to the metal fine lines 114 to be reflected thereby. By this, light transmitted through the reflection type polarizer 11 is provided to a polarizer on the back surface side of a liquid crystal panel, and light reflected by the reflection type polarizer 11 is reused.

In addition, although in the above-described embodiment the optical sheets 10 include the reflection type polarizer 11, the prism sheet 12, and the diffuser 13, the present invention is not limited thereto. As long as the configuration is such that the reflection type polarizer 11 is disposed closest to the liquid crystal panel side, the number or type of optical sheets is not particularly limited.

Furthermore, although in the above-described embodiment the black printing 60 is provided on the diffuser 13, the present invention is not limited thereto and the configuration may be such that the black printing 60 is provided on any other sheet than the diffuser 13.

Moreover, although in the above-described embodiment a light-shielding portion is implemented by providing the black printing 60 on the optical sheets 10, the present invention is not limited thereto. For example, a light-shielding portion may be implemented by sticking black tape onto the optical sheets 10 or a light-shielding portion may be implemented by filling in a portion on the optical sheets 10 in black with a marking pen.

Description of Reference Characters
  3: LIQUID CRYSTAL PANEL
  5: P WAVE
  6: S WAVE
  10: OPTICAL SHEET
  11: REFLECTION TYPE POLARIZER
  12: PRISM SHEET
  13: DIFFUSER
  20: LIGHT GUIDE PLATE 30: REFLECTION SHEET
40: LED (LIGHT-EMITTING DIODE)
50: CHASSIS
51: SIDE CHASSIS
52: TOP CHASSIS
60: BLACK PRINTING
L2: AMOUNT OF PROTRUSION
L5: WIDTH OF BLACK PRINTING

The invention claimed is:

1. A planar illumination device comprising: a plurality of light sources; a light guide plate for allowing light emitted from the light sources to exit in a planar manner; a plurality of optical sheets disposed on a light-emitting surface side of the light guide plate; and a reflection sheet disposed on an opposite side to the light-emitting surface side of the light guide plate with reference to a position of the light guide plate, wherein
the planar illumination device has a chassis for fixing the plurality of optical sheets,
at least one of the plurality of optical sheets has a light-shielding portion provided in a part of a region corresponding to a non-light-emitting region of the planar illumination device,
one of the plurality of optical sheets that is disposed in a position farthest from the light guide plate is a reflection type polarizer that allows some light to be transmitted therethrough and allows other light to be reflected thereby, and
a length of the reflection type polarizer is longer in a first direction than a length of the light guide plate such that an edge of the reflection type polarizer is located closer to a side of the light sources than is an edge of the light guide plate, the first direction being a direction perpendicular to a plane on which the light sources are provided out of planes forming the chassis.

2. The planar illumination device according to claim 1, wherein a distance in the first direction between the edge of the light guide plate and the edge of the reflection type polarizer is at least one-third of a distance between the edge of the light guide plate and the plane of the chassis having the light sources provided thereon.

3. The planar illumination device according to claim 1, wherein a distance in the first direction between the edge of the light guide plate and the edge of the reflection type polarizer is at least 1 millimeter.

4. The planar illumination device according to claim 1, wherein the light-shielding portion is provided in at least a one-third region, in the first direction, of a region from a position corresponding to an edge of a light-emitting region of the planar illumination device, on the optical sheet, to an edge of the optical sheet other than the reflection type polarizer.

5. The planar illumination device according to claim 1, wherein the light-shielding portion is formed by providing black printing on the optical sheet.

6. The planar illumination device according to claim 1, wherein a portion of the chassis is black, the portion being disposed more on a light-emitting surface side than the optical sheets.

7. The planar illumination device according to claim 6, wherein a thickness of the portion of the chassis disposed more on the light-emitting surface side than the optical sheets is 1.5 millimeters or less.

8. The planar illumination device according to claim 1, wherein the reflection type polarizer is composed of a plurality of thin films with different refractive indices, and allows linearly polarized light oscillating in a specific direction to be transmitted therethrough and allows linearly polarized light oscillating in a direction perpendicular to the specific direction to be reflected thereby.

9. The planar illumination device according to claim 1, wherein
the reflection type polarizer is composed of a cholesteric liquid crystal layer and a phase plate,
the cholesteric liquid crystal layer allows circularly polarized light rotating in a specific direction to be transmitted therethrough and allows circularly polarized light rotating in a direction which is different from the specific direction to be reflected thereby, and
the phase difference plate turns the circularly polarized light having been transmitted through the cholesteric liquid crystal layer into linearly polarized light.

10. The planar illumination device according to claim 1, wherein the reflection type polarizer is composed of a base having a plurality of metal fine lines formed thereon, and for the light having a wavelength greater than a spacing between the plurality of metal fine lines, the reflection type polarizer allows a component having an electric-field vector perpendicular to the metal fine lines to be transmitted therethrough and allows a component having an electric-field vector parallel to the metal fine lines to be reflected thereby.

11. A display device further comprising a display panel; and a planar illumination device according to claim 1.

* * * * *